(12) United States Patent
Taboada-Serrano et al.

(10) Patent No.: US 8,551,617 B2
(45) Date of Patent: Oct. 8, 2013

(54) MAGNETIC FILTRATION PROCESS, MAGNETIC FILTERING MATERIAL, AND METHODS OF FORMING MAGNETIC FILTERING MATERIAL

(75) Inventors: Patricia Taboada-Serrano, La Paz (BO); Constantino Tsouris, Oak Ridge, TN (US); Cristian I. Contescu, Knoxville, TN (US); Joanna McFarlane, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 570 days.

(21) Appl. No.: 12/338,442

(22) Filed: Dec. 18, 2008

(65) Prior Publication Data

US 2010/0155335 A1    Jun. 24, 2010

(51) Int. Cl.
*B32B 5/16*      (2006.01)
(52) U.S. Cl.
USPC ........................................ 428/403; 428/319.1
(58) Field of Classification Search
USPC ................................ 428/319.1, 403; 210/663
See application file for complete search history.

(56) References Cited

U.S. PATENT DOCUMENTS

| | | | |
|---|---|---|---|
| 6,465,390 B1 * | 10/2002 | Hakata et al. | 502/182 |
| 2003/0190471 A1 * | 10/2003 | Carpenter et al. | 428/402 |
| 2007/0235046 A1 * | 10/2007 | Gedevanishvili | 131/200 |

OTHER PUBLICATIONS

Translation of KR 2003015599, Kang et al., Feb. 25, 2003, 14 pages.*

* cited by examiner

*Primary Examiner* — Hai Vo
(74) *Attorney, Agent, or Firm* — Scully, Scott, Murphy & Presser, P.C.

(57) ABSTRACT

The present invention provides magnetically responsive activated carbon, and a method of forming magnetically responsive activated carbon. The method of forming magnetically responsive activated carbon typically includes providing activated carbon in a solution containing ions of ferrite forming elements, wherein at least one of the ferrite forming elements has an oxidation state of +3 and at least a second of the ferrite forming elements has an oxidation state of +2, and increasing pH of the solution to precipitate particles of ferrite that bond to the activated carbon, wherein the activated carbon having the ferrite particles bonded thereto have a positive magnetic susceptibility. The present invention also provides a method of filtering waste water using magnetic activated carbon.

3 Claims, 1 Drawing Sheet understand# MAGNETIC FILTRATION PROCESS, MAGNETIC FILTERING MATERIAL, AND METHODS OF FORMING MAGNETIC FILTERING MATERIAL This invention was made with government support under contract no. DE-AC05-00OR22725 awarded by the U.S. Department of Energy. The government has certain rights in the invention.

FIELD OF THE INVENTION

The present invention generally relates to filter materials and methods of filtering waste fluids.

BACKGROUND OF THE INVENTION

Processes proposed for treatment of coal-bed methane produced water and other industrial waste waters include: desalination by freezing, desalination by methane-hydrate formation, ion exchange, and reverse osmosis. Although there have been several studies dealing with the applicability of these processes to the treatment of waste water, their applicability to coal-bed methane facilities has been limited. Some reasons why the above noted processes for waste water treatment have not been more commonly applied include increased costs in terms of energy demands, strenuous operating conditions, and detrimental effects on the water being treated.

SUMMARY OF THE INVENTION

In one embodiment, a sorbent material is provided that includes a carbon substrate having a surface area of approximately 100 $m^2$ per gram or greater and having ferrite particles of nanoscale dimension present on the carbon substrate in greater than 0.1 wt %, wherein the carbon substrate having the ferrite particles attached thereto has a positive magnetic susceptibility.

In another aspect, a method of forming magnetic activated carbon is provided that includes providing activated carbon in a solution containing ions of ferrite forming elements, wherein at least one of the ferrite forming elements has an oxidation state of +3 and at least a second of the ferrite forming elements has an oxidation state of +2, and increasing the pH value of the solution to precipitate particles of ferrite having nanoscale dimensions from the ferrite forming elements of the solution onto the activated carbon, wherein the activated carbon having the particles of ferrite attached thereon are magnetically responsive.

In another aspect, a method of filtering is provided that includes introducing magnetic activated carbon to a waste water comprised of at least one of heavy metals or organic contaminants, the magnetic activated carbon sorbs at least a portion of the heavy metals or organic contaminants and forms aggregates through attractive forces between the magnetic activated carbon and the at least one of the heavy metals or the organic contaminants; and filtering the waste water through a porous medium to collect the aggregates.

BRIEF DESCRIPTION OF THE DRAWINGS

The following detailed description, given by way of example and not intended to limit the invention solely thereto, will best be appreciated in conjunction with the accompanying drawings, wherein like reference numerals denote like elements and parts, in which.

DETAILED DESCRIPTION OF THE INVENTION

Figure 1:
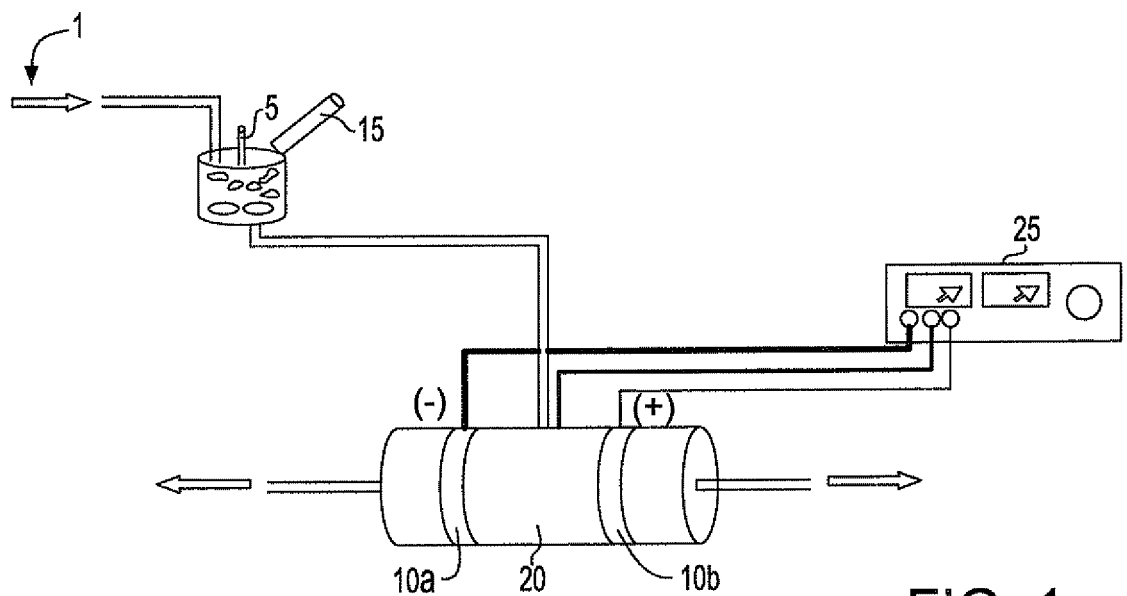
FIG. 1 depicts a schematic of one embodiment of a method of filtering that includes introducing magnetic activated carbon to a waste water comprised of at least one of heavy metals and organic contaminants and filtering the waste water including the magnetic activated carbon introduced therein through a porous medium, in accordance with the present invention.

The present invention relates to activated carbon that has been magnetized by precipitation of nanoscale particles of ferrite to the surface of the activated carbon. By synthesizing particles of ferrites, such as magnetite, using wet chemical synthesis, the particle size of the ferrites can be controlled to provide ferrite particles of a nanoscale dimension and having a positive magnetic susceptibility. Wet chemical synthesis of the ferrite particles in an aqueous solution containing activated carbon confers magnetic properties to the activated carbon through precipitation of the ferrite particles onto the activated carbon. In one application, the sorption properties of the activated carbon, resulting from the high surface area and porosity of activated carbon, are utilized to separate contaminants from waste water including dissolved ionic species, heavy metal ions, organic contaminants, dissolved charged organic species, and colloidal particulates, wherein the magnetic properties of the activated carbon having ferrite particles loaded thereon result in the formation of aggregates of activated carbon that may be separated from the waste water using porous filter media, also referred to sorption material. In some embodiments, the present invention advantageously allows for the sorption properties of activated carbon to be employed in combination with magnetic attractive forces and physical filtering, i.e., straining, wherein the combination of sorption, magnetic attractive forces and physical filtering allows for enhanced removal of contaminates from waste fluids.

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

When describing the inventive structures and methods, the following terms have the following meanings, unless otherwise indicated.

The term "activated carbon" as used throughout the present disclosure denotes a form of carbon that has a surface area of approximately 100 $m^2$ per gram or greater, as determined by nitrogen gas adsorption at 77 K.

"Microporous" means the property of a porous materials of having pores with a width smaller than 2 nm, as determined by adsorption of nitrogen at 77 K or adsorption of carbon dioxide at 273 K.

"Mesoporous" means the property of a porous material of having pores with a width smaller than 50 nm and larger than 2 nm, as determined by adsorption of nitrogen at 77 K.

The term "ferrite" denotes a class of chemical compounds with the formula $xMO_n \cdot yFe_2O_3$ where M is a metal cation in oxidation state +2 and Fe is an iron cation in oxidation state +3. If x=y=1 and n=1, a spinelic ferrite with general formula $MFe_2O_4$ is formed. The "ferrite forming elements" are the metal cations that provide M and Fe in the above chemical formula.

The term "magnetic susceptibility" refers to the degree of magnetization of a material in response to an applied magnetic field. The volume magnetic susceptibility, represented by the symbol $\chi_v$, is defined by the relationship $M=\chi_v H$, wherein M is the magnetization of the material (the magnetic dipole moment per unit volume), measured in amperes per meter, and H is the magnetic field strength, also measured in amperes per meter.

"Adsorption", "adsorbs" and "adsorbed" as used herein is a process that occurs when a gas or liquid solute accumulates on the surface of a solid or a liquid (adsorbent), forming a film of molecules or atoms (the adsorbate). It is different from "absorption", in which a substance diffuses into a liquid or solid to form a solution. The terms "sorption", "sorbed" and "sorbs" encompasses both processes, while "desorption" is the reverse process. A "sorbent material" is a material that performs sorption.

As used herein "nanoparticles" or "nanoscale objects" are objects having at least one dimension between 1 nm and 100 nm.

"Magnetically responsive" as used herein denotes an object having a positive magnetic susceptibility.

The term "electrosorption" as used herein denotes a phenomenon whereby two charged electrodes are used to remove ions of opposite electrical charge from a solution.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention, in one embodiment, in which the ferrite particles are composed of magnetite, provides a method of forming magnetic activated carbon that includes providing carbon fibers in an aqueous solution containing ions of $Fe^{3+}$ and $Fe^{2+}$ in approximately a 2:1 ratio, and then increasing the pH value of the solution to precipitate nanoscale particles of magnetite, which are attached on the carbon fibers. By "attached" it is meant that the nanoscale particles of magnetite are physically or mechanically bonded to the surface of the activated carbon. In accordance with the present invention, the carbon fibers having the magnetite attached thereto have magnetic properties. It is noted that other ferrite particles besides magnetite are contemplated by the present invention and are discussed in greater detail below.

Activated carbon is suitable as a filter material, or sorption material, because it acts as an adsorbent which can, effectively sorb and remove particles and organics from a fluid medium, such as water. Adsorption is one process by which activated carbon removes substances from fluids. Adsorption is a removal process where certain particles are bound to an adsorbent particle surface by either chemical or physical attraction.

Activated carbon is typically an effective adsorbent material due to its extensive porosity that provides a large surface area. Activated carbon may be characterized as having pore sizes suitable for micro-porous materials and mesoporous materials. In one embodiment, micro-pores are suitable for adsorption of small molecules and heavy metal ions, whereas meso-pores are suitable for adsorption of larger molecules, such as organic molecules. In one example, a sample of activated carbon having a mass of approximately 1 gram may have a surface area of at least 100 m². In another embodiment, a gram of activated carbon can have a surface area in excess of 500 m², with a surface area on the order of approximately 1500 m² being readily achievable. In one embodiment, activated carbon adsorption proceeds through 3 basic steps: substances adsorb to the exterior of the carbon granules, substances move into the carbon pores and substances adsorb to the interior walls of the carbon.

The activated carbon that may be employed in the present invention can be selected from a variety of different geometries and sizes. In one embodiment, the activated carbon is provided by carbon fibers having a length ranging from about 100 μm to about 1000 μm, and having a diameter ranging from about 5 μm to about 30 μm. In another embodiment, the carbon fibers can have a length ranging from about 300 μm to about 500 μm, and can have a diameter ranging from about 10 μm to about 20 μm. In an even farther embodiment, the carbon fibers have a length of about 400 μm, and have a diameter of about 15 μm. Other geometries for the activated carbon include carbon powder and carbon granules. Carbon powder typically has a particle size of less than about 0.5 mm and carbon granules typically have a particle size of greater than about 0.5 mm.

In accordance with one aspect, the activated carbon is magnetized. In one embodiment, the activated carbon is magnetized by the attaching of at least one type of nanoscale ferrite particle. Ferrites are mixed oxides and form a broad class of magnetic ceramic materials. The general chemical formula of ferrites is $xMO_n \cdot yFe_2O_3$. If M is a divalent element with an ionic radius smaller than 0.1 nm, a spinelic ferrite ($MO \cdot Fe_2O_3$; n=1) is formed. The spinelic structure typically consists of a cubic close packed arrangement of oxygen ions, in which the cations reside on tetrahedral and octahedral interstices. When M is Fe (II), the ferrite particle is $Fe_2O_3 \cdot FeO$ (or equivalently, $Fe_3O_4$) and is known as magnetite. Other ferrite particles suitable for the present invention include, but are not limited to copper ferrite ($Fe_2O_3 \cdot CuO$), nickel ferrite ($Fe_2O_3 \cdot NiO$), zinc ferrite ($Fe_2O_3 \cdot ZnO$), manganese ferrite ($Fe_2O_3 \cdot MnO$), cobalt ferrite ($Fe_2CO_3 \cdot CoO$), and mixed ferrites such as the copper-nickel mixed ferrite ($Fe_2O_3 \cdot Cu_xNi_yO$, wherein x+y=1).

Particles of ferrite are typically formed from an aqueous solution in which salts have been dissolved to provide ions of ferrite forming elements having oxidation states of +3 and +2, e.g., $Fe^{3+}$ and $Fe^{2+}$, wherein the ions form nanoscale particles and precipitate from the solution when the pH of the solution is increased, e.g., by the addition of $NH_4OH$ in amounts suitable to increase the pH of the solution to about 10 or greater. In one example, the salts that provide the ions of ferrite forming elements having the oxidation state of +3 include, but are not limited to $FeCl_3 \cdot 6H_2O$, $Fe(NO_3)_3 \cdot 9H_2O$, and $Fe(SO_4)_3 \cdot 6H_2O$. In one example, the salts that provide the ions of ferrite forming elements having the oxidation state of +2 include, but are not limited to $FeSO_4 \cdot 7H_2O$, $CuCl_2 \cdot 2H_2O$, $CoCl_2 \cdot 6H_2O$, $Mn(NO_3)_2$, and $NiSO_4 \cdot 6H_2O$.

Typically, the reagents, i.e., salts, are selected to provide a ratio of ions of ferrite forming elements having an oxidation state of +3 to ions of ferrite forming elements having an oxidation state of +2 that provides the stoichiometric composition characteristic for ferrite as discussed above.

Typically, the reagents, i.e., salts, are dissolved in the aqueous solution in proportions suitable to provide a ratio of ions of ferrite forming elements having an oxidation state of +3 to ions of ferrite forming elements having an oxidation state of +2 ranging from approximately 3:1 to approximately 1.5:1. In another embodiment, the ratio of the ions of the ferrite forming elements having an oxidation state of +3 to the ions of ferrite forming elements having an oxidation state of +2 ranges from approximately 2.5:1 to approximately 1.5:1. In one example, the ratio of the ions of the ferrite forming elements having an oxidation state of +3 to the ions of ferrite forming elements having an oxidation state of +2 is 2:1.

In some examples, the ferrite particles may be synthesized from the above-described reagents, i.e., salts, using chemical methods, such as wet chemical methods that include, but are not limited to: complexation, coprecipitation, and sol-gel processing.

Complexation refers to the formation of a chemical species by the coordination of groups of atoms termed ligands to a central ion, commonly a metal ion. Generally, the ligand coordinates by providing a pair of electrons that forms a chemical bond to the central ion. Coprecipitation is the process of simultaneous or concurrent precipitation of at least two different compounds by adjusting the pH of an aqueous solution containing at least two different precursor salts. Sol-gel processing is a wet-chemical technique starting either from a chemical solution (sol short for solution) or colloidal particles (sol for nanoscale particle) to produce an integrated network (gel). Typical precursors are metal alkoxides and metal chlorides, which undergo hydrolysis and polycondensation reactions to form a colloid (a system composed of solid particles with size ranging from about 1 nm to about 1 μm dispersed in a solvent. The sol evolves then towards the formation of an inorganic continuous network containing a liquid phase (gel). Thereafter, a drying process serves to remove the liquid phase from the gel thus forming a porous material.

In one embodiment, wet chemical synthesis of ferrite particles provides a uniform particle size distribution, wherein the average size of ferrite particles produced using the above-described wet chemical synthesis is less than 500 nm, typically ranging from about 2 nm to about 250 nm, and in some instances ranging from about 5 nm to about 20 nm. Further, wet chemical synthesis typically results in high quality ferrites with homogeneous impurity-free particles. Homogeneous refers to a narrow distribution of particle sizes. More specifically, in one embodiment, a homogeneous particle size distribution means that the ferrite particles have a standard deviation from the mean diameter that does not exceed 30% of the mean diameter. In another embodiment, a homogeneous particle size distribution means that the ferrite particles have a standard deviation from the mean diameter that does not exceed 20% of the mean diameter. In even further embodiment, a homogeneous particle size distribution means that the ferrite particles have a standard deviation from the mean diameter that does not exceed 5% of the mean diameter. High purity means that the ferrite particles are substantially free of elements that have not been purposefully added to the composition of the ferrite particles. In one embodiment, the ferrite particles are 90% pure or greater. In another embodiment, the ferrite particles are 95% pure or greater. In an even further embodiment, the ferrite particles are 99% pure or greater.

It has been determined that the particle size, i.e., average particle size, and particle size distribution of the ferrites affects the magnetic properties of the ferrites, such as magnetic saturation, magnetization, and coercivity. More specifically, in one embodiment, as the particle size of the ferrite particles is reduced, the magnetic properties change, in which the typical ferromagnetic character of ferrites changes to being paramagnetic.

Ferromagnetic materials have a large and positive susceptibility to an external magnetic field. They exhibit a strong attraction to magnetic fields and are able to retain their magnetic properties after the external field has been removed. Ferromagnetic materials contain many ions with unpaired electronic spins so they have a net magnetic moment. They get their strong magnetic properties due to the presence of magnetic domains. In these domains, large numbers of atom's moments ($10^{12}$ to $10^{15}$) are aligned parallel so that the magnetic moment within the domain is strong. In ferromagnetic materials the magnetic domains tend to orient themselves spontaneously, thus generating a strong macroscopic effect of spontaneous magnetization. The orientation effect occurs below a certain material-specific temperature, named Curie temperature. Above the Curie temperature, when a ferromagnetic material is in the unmagnetized state, the magnetic domains are nearly randomly organized and the net magnetic field for the part as a whole is zero. When a magnetizing force is applied, the domains become aligned to produce a strong magnetic field.

Paramagnetic materials have a small and positive susceptibility to magnetic fields. These materials are slightly attracted by a magnetic field and the material does not retain the magnetic properties when the external field is removed. Paramagnetic properties are due to the presence of some unpaired electronic spins, and from the realignment of the electron orbits caused by the external magnetic field.

The transition from ferromagnetic to paramagnetic character of magnetite occurs when the particle size is reduced to approximately 500 Å or less. Typically, paramagnetic character is measured in magnetite having a particle size ranging from about 10 Å to about 300 Å. In one example, paramagnetic character is measured in magnetite having a particle size ranging from about 50 Å to about 200 Å. The transition from ferromagnetic character to paramagnetic character with decreases in particle size to nanoscale dimensions may be referred to as superparamagnetism or collective paramagnetism.

In one embodiment, wet chemical synthesis provides homogeneous magnetite particles having nanoscale dimensions, in which colloidal chemistry parameters such as the nature and concentration of precursor salts, solution pH and temperature, the rate of addition of reagents, and solution maturation time, determine the stability of colloidal particles and their self-assembling properties, and therefore the resulting properties of magnetite particles. Wet chemical synthesis is based on formation of polynuclear coordination compounds with two different metal ions in the molecule, followed by decomposition of the coordination compounds to yield the ferritic mixed oxide. Typically, precipitation of the ferrite particles occurs when the pH is raised to greater than 9. In one embodiment, precipitation of the ferrite particles occurs when the pH is raised to greater than 10, and in one example precipitation of the ferrite particles occurs when the pH of the solution ranges from 10 to 11.

The method produces a homogeneous distribution of chemical species at the molecular level in the precipitate, from which the ferrite is formed simultaneously with the decomposition of the polynuclear coordinating compound, at temperatures ranging from about 40° C. to about 90° C. It is noted that the temperature at which wet chemical synthesis is conducted is lower than the temperatures used to form ferrites using ceramic synthesis principles, in which sintering at temperatures ranging from about 400° C. to about 900° C. of constituents composed of oxides, carbonates, and oxalates produces ferrites having large particles with a broad distribution of sizes which causes the material to exhibit non-reproducible magnetic properties. In one embodiment, the temperatures and colloidal chemistry parameters of the wet chemistry synthesis of ferrite results in decreased particle size and a more uniform particle size distribution of chemically synthesized ferrite in comparison to ferrites synthesized by ceramic sintering.

In one embodiment, because of the low process temperature, the ferrite particles, e.g., magnetite, formed by wet chemical synthesis such as complexation are in an ultra-fine state of dispersion and are better described as nanoscale objects, or nanoparticles. In the embodiments of the invention, in which wet chemical synthesis of the ferrite particles is provided by complexation, the ligands may include polycarboxylic acids, polyhydroxycarboxylic acids, and amino acids. In some embodiments, such as when the ferrite particle being produced is magnetite, the ferrite may be precipitated from solution without the addition of ligands, if the solution composition and the precipitation conditions are well controlled. For example, in one embodiment in which the precipitating agent is ammonium hydroxide $NH_4OH$), the precipitating agent itself may function as a ligand in the formation of ferrite precipitates.

It has been determined that wet chemical synthesis of nanoscale particles of ferrite in the presence of activated carbon results in the nanoscale particles of ferrite being precipitated onto the surface of the activated carbon, hence rendering the activated carbon magnetically responsive. Carbon, such as activated carbon without the addition of nanoscale ferrites as described herein, is typically diamagnetic Diamagnetism is the property of an object, which causes it to create a magnetic field in opposition of an externally applied magnetic field, thus causing a repulsive effect. Diamagnetic materials have a relative magnetic permeability that is less than 0, hence having a negative magnetic susceptibility, and are therefore repelled by magnetic fields. It has been determined that in accordance with some embodiments of the present invention that by attaching ferrite particles to substrates containing carbon, such as activated carbon, in amounts greater than 0.1 wt %, the magnetic susceptibility of the activated carbon can be converted to a positive value, and therefore be attracted to magnetic fields.

In one embodiment, wet chemical synthesis that is performed at room temperature is utilized to deposit nanoscale ferrite particles, such as magnetite ($Fe_3O_4$), onto the activated carbon fibers, wherein the nanoscale ferrite particles are attached to the surface of the activated carbon fibers. Wet chemical synthesis that is performed at room temperature may be referred to as cold precipitation.

In one example, the ferrite particle is magnetite that may be precipitated with the appearance of a black precipitate at pH values between approximately 10 and 11 by the dropwise addition of concentrated $NH_4OH$ to an aqueous solution containing salts of $Fe^{3+}$ and $Fe^{2+}$ in approximately a 2:1 ratio. In one example, the chemical equation illustrating the precipitation of nanoscale magnetite is as follows:

$$FeSO_4 + 2\ Fe(NO_3)_3 + 8\ NH_4OH = \downarrow Fe_3O_4 + (NH_4)_2SO_4 + 6\ NH_4NO_3 + 4H_2O$$

Another example is this:

$$FeSO_4 + 2\ FeCl_3 + 8\ NH_4OH = \downarrow Fe_3O_4 + (NH_4)_2SO_4 + 6\ NH_4Cl + 4H_2O$$

The black precipitate typically has magnetic properties, e.g., paramagnetic properties, and may be separated from the solution by filtration and washed to remove impurity ions that may be adsorbed on the surface of the precipitate. In some embodiments in which the activated carbon is present during the precipitation of the nanoscale ferrite, the precipitates are attached to the activated carbon, and the activated carbon that is obtained after filtration, washing, and drying has a positive magnetic susceptibility.

Although heating is typically not necessary to precipitate the nanoscale ferrite from the aqueous solution, and to attach the nanoscale ferrites to the activated carbon, the yield of magnetic activated carbon may be increased by heating the solution to a temperature within a range of about 50° C. to about 80° C., wherein in some examples the solution may be heated to a temperature within a range of about 60° C. to about 70° C.

In one embodiment, the nanoscale particles of ferrite, e.g., magnetite, that are attached to the activated carbon is present in amounts greater than 0.1 wt %, typically being greater than 1.0 wt %. In another embodiment, the nanoscale particles of ferrite that are present on the surface of the activated carbon is present in amounts ranging from 5 wt. % to 25 wt. %. In yet another embodiment, the nanoscale ferrite particles attached to the activated carbon is present in amounts ranging from 5 wt % to 10 wt %.

In one embodiment, the above method provides a sorption material including a carbon substrate, e.g., activated carbon fiber, having a surface area of approximately 100 $m^2$ or greater and including nanoscale particles of ferrite, e.g., magnetite, present on the carbon substrate, wherein the carbon substrate having the ferrite particles present thereon has a positive magnetic susceptibility. In one example, the carbon substrate having the ferrite particles present thereon has a paramagnetic character characterized by a magnetic susceptibility greater than $+1 \times 10^{-6}$.

Referring to FIG. 1, in one embodiment, the above-described magnetic activated carbon is employed in method of filtering waste fluids, such as waste water 1. In one embodiment, the method of filtering includes introducing magnetic activated carbon 15 to waste water 1 composed of at least one of heavy metals and organic contaminants. The magnetic activated carbon 15 adsorbs at least a portion of the heavy metals and organic contaminants and forms aggregates via the attraction of the particles of magnetic activated carbon 15, wherein each particle of the magnetic activated carbon 15 may have at least one heavy metal and/or organic contaminant adsorbed thereto. Thereafter, the waste water 1 including the magnetic activated carbon is filtered through a porous medium (also referred to as porous filter medium), i.e., physical filter 20, to collect the aggregates of the magnetic activated carbon, hence removing at least a portion of the heavy metals and organic contaminants from the waste water 1.

Magnetic activated carbon 15 may be added to the waste water 1 via an in-line mixer 5. The waste water 1 may be provided from industrial sources, such as coal-bed methane production sites, wherein the waste water 1 may contain a mixture of contaminants including colloidal particles, heavy metal ions, and soluble electrolytes.

Sorption of organic material and heavy metal ions onto the magnetic activated carbon 15 may occur simultaneously with aggregation of colloidal contaminants and the magnetic activated carbon. The high ionic strength of waste water 1 and produced water is beneficial to magnetic-seeded aggregation, because it enables attractive forces between aggregates to be dominant by diminishing the range of strong, repulsive electrostatic forces. The attractive forces between the aggregates include, but are not limited: Van der Waals forces and magnetic forces.

The method of the present invention typically filters heavy metal ions and organic materials from waste fluids. In one embodiment, the heavy metals that may be removed by the filtering include, but are not limited to: chromium, arsenic, cadmium, lead, mercury, manganese and combinations thereof. In one embodiment, the organic contaminants comprise 2,4-D, 2,4,5-TP (Silvex), Acrylamide, Alachlor, Atrazine, Benzoapyrene, Carbofuran, Chlordane, Dalapon, Di 2-ethylhexyl adipate, Di 2-ethylhexyl phthalate Dibromochloropropane, Dinoseb, Dioxin (2,3,7,8-TCDD), Diquat, Endothall, Endrin, Epichlorohydrin, Ethylene dibromide, Glyphosate, Heptachlor, Heptachlor epoxide, Hexachlorobenzene, Hexachlorocyclopentadiene, Lindane, Methoxychlor, Oxamyl, Vydate, PCBs polychlorinated biphenyls), Pentachlorophenol, Picloram, Simazine, Toxaphene, Benzene, Carbon Tetrachloride, Chlorobenzene, o-Dichlorobenzene, p-Dichlorobenzene, 1,1-Dichloroethylene, cis-1,2-Dichloroethylene, trans-1,2-Dicholoroethylene, Dichloromethane, 1,2-Dichloroethane,1,2-Dichloropropane, Ethylbenzene, Styrene, Tetrachloroethylene, 1,2,4-Trichlorobenzene, 1,1,1,-Trichloroethane, 1,1,2 Trichloroethane, Trichloroethylene, Toluene, Vinyl Chloride, Xylenes or combinations thereof.

In one embodiment, the aggregates of the magnetic activated carbon 15 having at least a portion of the heavy metals and organic contaminants from the waste water 1 bonded thereon typically have a greatest dimension, e.g. length, width, or diameter, ranging from about 25 µm to about 5000 µm. In another embodiment, the aggregates of the magnetic activated carbon have a greatest dimension ranging from about 100 µm to about 2500 µm. In an even further embodiment, the aggregates of the magnetic activated carbon have a greatest dimension ranging from about 500 µm to about 1000 µm.

Downstream of the in-line mixer 5, the waste water 1 is filtered through a porous filter medium 20, to collect the aggregates of the magnetic activated carbon removing at least a portion of the heavy metals and organic contaminants from the waste fluid, e.g., waste water 1.

Typically, the porous filter medium 20 is composed of a metal containing material. In one embodiment, the porous filter medium 20 is composed of a ferrite containing material. In one embodiment, the porous filter medium 20 is composed of a thin, porous steel based material, such as steel wool. In other embodiments of the present invention, other materials to which magnetic material are attracted may be utilized for the porous filter medium 20. For examples, metals including iron, cobalt and nickel, as well as alloys thereof, are suitable for the material of the porous filter medium 20.

The porous filter medium 20 has a pore size suitable for removing aggregates of the magnetic activated carbon from the waste fluid, i.e., waste water 1. In one embodiment, the porous filter medium 20 has a pore size diameter of about 5 microns or greater. In another embodiment, the porous filter medium 20 has a pore size diameter of about 20 microns or greater. In an even further embodiment, the porous filter medium 20 has a pore size diameter of about 50 microns or greater. Other dimensions have been contemplated for the pore size dimensions as long as the pore size provides for the filtering of the aggregates of the magnetic activated carbon from the waste water 1.

In one embodiment, deposition of the aggregates onto the porous filter medium 20 is promoted by an external magnetic field or electric field that is produced inside the porous filter medium 20. Using this method, because the magnetic dipoles of magnetic activated carbon-containing aggregates tend to align with the magnetic field, the deposits of the aggregates of magnetic activated carbon on the porous filter medium 20 (also referred to as filtration deposits) is highly structured. More specifically, the alignment of the aggregates within the deposits of the magnetic activated carbon in the porous filter varies with the local structure of the porous filter medium 20, the local intensity of magnetic field, and the flow pattern of the waste water 1 through the porous filter medium 20. The presence of carbon in the aggregates on the porous filter medium 20 makes them electrically conductive, i.e. it converts them into a structured filtration deposit or membrane that can be used as an electrode 10a, 10b. The presence of two parallel, independent filtration media allows for the utilization of an externally applied electric field to obtain two electrodes: a cathode, 10a, i.e., negative electrode, and an anode, 10b, i.e., positive electrode.

In one example, the electric field is provided by an electrical current applied to the anode 10b and cathode 10b of the porous filter medium 20. In one embodiment, the electrical current is applied to the anode and cathode 10 by an alternating current source 25.

During filtration, ions of positive and negative charge are trapped within the structure of the filtration deposits (i.e., the magnetic, electrically conductive aggregates of the magnetic activated carbon) on the anode and cathode 10a, 10b of opposite charge. Therefore, desalination of the waste water 1 may take place via electrosorption, i.e., entrapment of ions in solution within the electrical double layer surrounding the magnetic activated carbon.

At the end of the operation cycle, removing the magnetic and electric fields produced by alternating current source 25 in the porous filter medium 20 will allow for the recovery of highly concentrated waste and regeneration of the filter medium.

EXPERIMENTATION

An aqueous solution of salts was prepared by dissolving solid salts of $FeSO_4 \cdot 7H_2O$ and $Fe(NO_3)_3 \cdot 9H_2O$ in water, in which the concentration ratio of $Fe(NO_3)_3$ to $FeSO_4$ was 2:1. Activated carbon was then immersed in the aqueous solution. The type of activated carbon fibers included AP 400, as provided by Anshan East-Asia Carbon Co, in the form of a powder composed of carbon fibers having a length of 400 µm and a diameter of 15 µm. The amount of activated carbon fibers was selected such that if all the iron that was contained in the aqueous solution precipitated onto the activated carbon fibers, the final loading of the ferrite precipitates on the activated carbon fibers in the dry state of the final product would be in a target concentration range corresponding to either one of 5 wt % or 10 wt % of magnetite ($Fe_3O_4$). Magnetite was precipitated from the aqueous solution by the dropwise addition of $NH_4OH$ to the solution to increase the pH of the solution to within a range of 10 to 11, consistent with the following chemical equation:

$$FeSO_4 + 2\ Fe(NO_3)_3 + 8\ NH_4OH = \downarrow Fe_3O_4 + (NH_4)_2SO_4 + 6\ NH_4NO_3 + 4H_2O \qquad 1.$$

Figure 2:
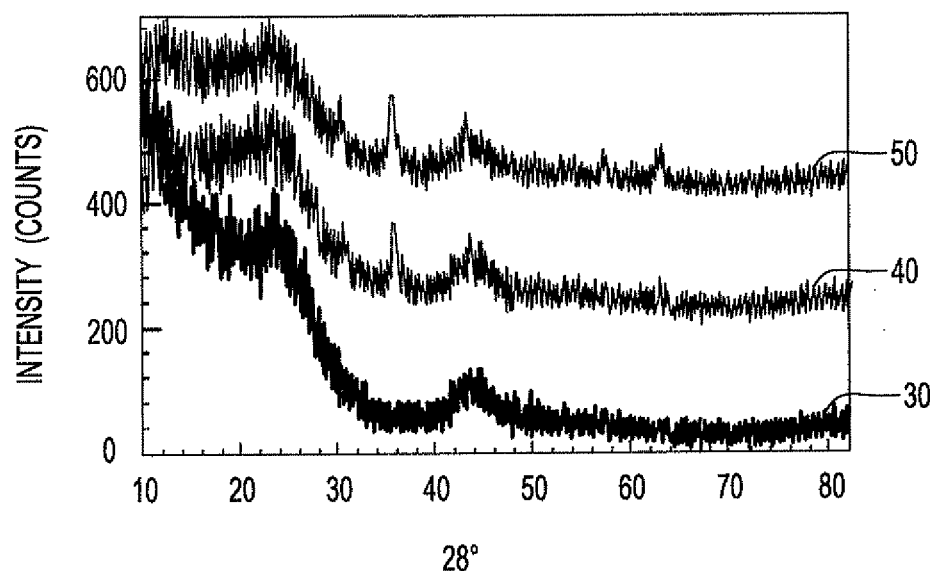
FIG. 2 depicts plots of X-ray diffraction (XRD) patterns of pure carbon fibers, carbon fibers having a 5 wt. % concentration of magnetite particles disposed thereon, and carbon fibers having a 10 wt. % concentration of magnetite particles disposed thereon, in accordance with the present invention.

The presence of magnetite phase in the activated carbon fibers was confirmed through X-ray diffraction (XRD) measurements. Referring to FIG. 2, X-ray diffraction analysis was conducted for activated carbon without the addition of magnetite (the plot depicted by reference number 30), activated carbon having magnetite present in an amount equal to 5 wt % (the plot depicted by reference number 40), and activated carbon having magnetite present in an amount equal to 10 wt % (the plot depicted by reference number 40). For the highest loading of 10 wt. % $Fe_3O_4$, the BET surface area of the activated carbon fibers, as measured by nitrogen adsorption at 77 K, was reduced from 1530 $m^2$/g to 1170 $m^2$/g, and the average pore size increased from 1.4 nm to 1.7 nm due to the obliteration of the smallest pores. As depicted in FIG. 2, in which $Fe_3O_4$ is attested by the peaks indicated by reference number 100, the magnetite particles present were well dispersed on the activated carbon fibers, with an average particle size of 16 nm, calculated from the half width of the XRD lines.

Magnetic susceptibility at room temperature of carbon fiber materials with and without magnetite loading was measured using a MSB auto magnetic susceptibility balance (Sherwood Scientific, U.K.). Although pure carbon is diamagnetic ($\chi=-2\times10^{-5}$ for diamond, $\chi=-2\times10^{-5}$ for graphite), the activated carbon fibers AP-400 were measured to have paramagnetic characteristics ($\chi=+1.8\times10^{-6}$). It has been determined that the paramagnetic character of the activated carbon is caused by the existence of unpaired electronic spins and dangling bonds at carbon atoms exposed at the extended internal surface of these materials. The activated carbon fibers loaded with magnetite had a stronger paramagnetic character caused by magnetite nanoparticles attached to carbon ($\chi=+1.2\times10^{-4}$ for 5 wt % $Fe_3O_4$, $\chi=3.6\times10^{-4}$ for 10 wt % $Fe_3O_4$).

The phenomenon at which ferromagnetic materials exhibit a behavior similar to paramagnetism even at temperatures below the Curie temperatures is know as superparamagnetism. It is observed that in very fine parties, such as particles being less than 20 nm in size, and in some instances being less than 10 nm in size, each particle behaves as an individual magnetic domain, for which the energy required to align the direction of magnetic moments is comparable to thermal energy. The superparamagnetism of $Fe_3O_4$ supported on AP-400 carbon fibers, corroborated with the information from XRD analysis, indicates that each $Fe_3O_4$ nanoparticle, having an average size of 16 nm, is an individual magnetic domain.

While the present invention has been particularly shown and described with respect to the preferred embodiments thereof, it will be understood by those skilled in the art that the foregoing and other changes in forms of details may be made without departing form the spirit and scope of the present invention. It is therefore intended that the present invention not be limited to the exact forms and details described and illustrated, but fall within the scope of the appended claims.

What is claimed:

1. A sorbent material comprising:
a carbon substrate having a surface area of approximately 100 $m^2$ or greater per gram of the carbon substrate; and
ferrite having a composition selected from the group consisting of magnetite ($Fe_3O_4$), copper ferrite ($Fe_2O_3.CuO$), nickel ferrite ($Fe_2O_3.NiO$), zinc ferrite ($Fe_2O_3.ZnO$), cobalt ferrite ($Fe_2O_3.CoO$), copper-nickel ferrite ($Fe_2O_3.Cu_xNi_yO$) and combinations thereof, wherein the ferrite does not contain manganese, wherein the ferrite has a particle size ranging from 10 Å to 300 Å and a particle size distribution so that ferrite particles have a standard deviation from a mean diameter that does not exceed 20% of the mean diameter, wherein the ferrite is present on the carbon substrate in amounts ranging from 5 wt. % to 25 wt. %, wherein the carbon substrate having the ferrite attached thereto is paramagnetic having a positive magnetic susceptibility, wherein the positive magnetic susceptibility is greater than $+1\times10^{-6}$.

2. The sorbent material of claim 1, wherein the carbon substrate has a surface area of approximately 500 $m^2$ or greater per gram of the carbon substrate.

3. The sorbent material of claim 1, wherein the carbon substrate has a geometry of powder, fibers or granules.

* * * * *